(12) United States Patent
Komatsubara et al.

(10) Patent No.: US 10,601,175 B2
(45) Date of Patent: Mar. 24, 2020

(54) BALL LOCK TYPE CONNECTOR WITH UNWANTED-REMOVAL PREVENTION MECHANISM

(71) Applicant: Canare Electric Co., Ltd., Nisshin-shi, Aichi (JP)

(72) Inventors: Manabu Komatsubara, Kanagawa (JP); Naoki Yoshimori, Kanagawa (JP)

(73) Assignee: CANARE ELECTRIC CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 16/097,199

(22) PCT Filed: Mar. 26, 2018

(86) PCT No.: PCT/JP2018/012200
§ 371 (c)(1),
(2) Date: Oct. 26, 2018

(87) PCT Pub. No.: WO2019/186657
PCT Pub. Date: Oct. 3, 2019

(65) Prior Publication Data
US 2020/0036133 A1 Jan. 30, 2020

(51) Int. Cl.
*H01R 13/627* (2006.01)
(52) U.S. Cl.
CPC .................. *H01R 13/6276* (2013.01)
(58) Field of Classification Search
CPC .... H01R 13/62; H01R 13/623; H01R 13/625; H01R 13/6276; H01R 13/639
(Continued)

(56) References Cited

U.S. PATENT DOCUMENTS 5,285,510 A * 2/1994 Slaney ................ G02B 6/3821
385/78
5,702,254 A * 12/1997 Whitson .............. H01R 33/465
439/168
(Continued)

FOREIGN PATENT DOCUMENTS

FR 2462797 A1 * 2/1981 .......... H01R 13/627
JP S49-026530 B1 7/1974
(Continued)

OTHER PUBLICATIONS

International Search Report and Written Opinion for related International Application No. PCT/JP2018/012200, dated May 29, 2018; English translation provided; 14 pages.

*Primary Examiner* — Edwin A. Leon
*Assistant Examiner* — Milagros Jeancharles
(74) *Attorney, Agent, or Firm* — Procopio, Cory, Hargreaves & Savitch LLP

(57) ABSTRACT

A connector with a lock mechanism includes a connector 10 and a counterpart connector 20. A connector main body 11 of the connector 10 has an annular groove 113. An inner sleeve 17 and an outer sleeve are arranged movably in an axial direction on an outer circumferential surface of the connector main body 11 and outside the inner sleeve 17, respectively. The outer sleeve 13 has a locking pin 15 projecting from an inner circumferential surface close to a front end of the outer sleeve 13. A ball accommodation hole 22, an inlet groove 26, and a circumferential direction groove 28 are formed in a tubular member 21 of the counterpart connector 20. When the connector main body 11 is inserted into the tubular member 21, an engaging ball 23 accommodated in the ball accommodation hole 22 becomes engaged with the annular groove 113 and the locking pin 15 becomes engaged with the inlet groove 26, allowing the connectors to be connected with each other. When the outer
(Continued)

(A)

(B)

(C)

sleeve 13 is rotated with respect to the tubular member 21, the locking pin 15 becomes engaged with the circumferential direction groove 28 and restricts the movement of the outer sleeve 13 and the connector main body 11 in the axial direction.

5 Claims, 7 Drawing Sheets

(58) Field of Classification Search
USPC ......... 439/8, 10, 11, 13, 17, 19, 25, 29, 259, 439/261, 269.2, 348
See application file for complete search history.

(56) References Cited

U.S. PATENT DOCUMENTS

| | | | | |
|---|---|---|---|---|
| 6,062,891 A | * | 5/2000 | Villiers | H01R 13/6276 439/348 |
| 6,716,048 B2 | * | 4/2004 | Collin | H01R 13/6276 439/317 |
| 7,241,055 B2 | * | 7/2007 | Takahashi | G02B 6/3877 385/55 |
| 2002/0132509 A1 | * | 9/2002 | Collin | H01R 13/6276 439/347 |
| 2004/0121641 A1 | * | 6/2004 | Fawcett | H01R 13/6276 439/348 |
| 2005/0208820 A1 | * | 9/2005 | Sanuki | H01R 13/623 439/372 |
| 2007/0037430 A1 | * | 2/2007 | Evans | H01R 13/625 439/314 |
| 2007/0111582 A1 | * | 5/2007 | Yoshimori | G02B 6/389 439/348 |
| 2014/0262496 A1 | | 9/2014 | Burrow et al. | |
| 2016/0186792 A1 | * | 6/2016 | Valencia | F16B 7/0406 403/349 |
| 2018/0131160 A1 | * | 5/2018 | Zhang | G06K 9/2036 |

FOREIGN PATENT DOCUMENTS

| | | |
|---|---|---|
| JP | 60-110807 U | 7/1985 |
| JP | H0955257 A | 2/1997 |
| JP | 2002-323641 A | 11/2002 |
| JP | 2004-319313 A | 11/2004 |
| JP | 2017-045597 A | 3/2017 |

* cited by examiner (A)

(B)

(C)

BALL LOCK TYPE CONNECTOR WITH UNWANTED-REMOVAL PREVENTION MECHANISM

TECHNICAL FIELD

The present invention relates to a connector and, in particular, it relates to a ball-lock type connector which can be easily attached to or removed from a counterpart connector and whose unwanted removal from the counterpart connector can be prevented.

BACKGROUND ART

The ball-lock type connector having a mechanism of locking a connector and a counterpart connector in a connected state is already known (Patent Literature 1 and Patent Literature 2, for example).

The connector of this type is configured such that it includes an engaging ball (lock ball) accommodated movably in a diameter direction in a ball support hole of a cylindrical fitting part of the connector. When part of the engaging ball projecting from a circumferential surface of the cylindrical fitting part becomes engaged with an engaging groove of a counterpart connector fitting to the cylindrical fitting part, the connectors are held in a connected state with each other.

CITATION LIST

Patent Literature

PTL 1: Japanese Patent Application Laid-open No. Hei 9 (1997)-55257
PTL 2: Japanese Patent Application Laid-open No. 2002-32364

SUMMARY OF INVENTION

Technical Problem

The connector disclosed in Patent Literatures 1 and 2 described above has an advantage of the ball-lock type being easily attached to and removed from the counterpart connector. However, since the connector can be removed simply by sliding an outer cylinder or an outer sleeve in a pressing direction of a compression spring, a connected state of the connecters can be released by mistake. In a connector for communications where prevention of stoppage of signaling is extremely important and a high-output optical connector where prevention of optical loss and optical leak is extremely important, there is a case where measures to prevent the unwanted release from a connected state is called for.

Also, the conventional connector is configured to allow some backlash between the connectors in the connected state so that a user may feel with fingers that the connector has changed into a locked state with the counterpart connector. Such backlash, however, may have unfavorable influence on performance of an optical connector etc. and there is a case where measures to drastically reduce backlash is called for.

The present invention is devised to solve the above problems of the related art, and aims to provide a connector whose unwanted release from a connected state can be prevented.

Furthermore, the present invention aims to provide a connector that can reduce backlash between the connectors greatly.

Solution to Problem

In order to solve the first problem described above, the present invention is configured as follows. A connector with a lock mechanism of the present invention includes a connector and a counterpart connector which the connector can be attached to or removed from. The connector includes: a connector main body having an annular groove formed in an outer circumferential surface thereof; an inner sleeve arranged movably in an axial direction over the outer circumferential surface of the connector main body; and an outer sleeve arranged movably in an axial direction outside the inner sleeve and having a locking pin projecting from an inner circumferential surface closer to a front end of the outer sleeve. The counterpart connector includes: a tubular member in which at least one ball accommodation hole penetrating an inner circumferential surface from its outer circumferential surface, an inlet groove extending over the outer circumferential surface in an axial direction, and a circumferential direction groove extending over the outer circumferential surface in a circumferential direction and joining the inlet groove are formed; and an engaging ball accommodated in the ball accommodation hole. When the connector main body of the connector is inserted into the tubular member of the counterpart connector, the engaging ball moves in a diameter direction to be engaged with the annular groove, the locking pin becomes engaged with the inlet groove and, when the outer sleeve of the connector connected with the counterpart connector is rotated with respect to the tubular member, the locking pin further becomes engaged with the circumferential direction groove.

In one of the preferred embodiments according to the present invention, it is preferable to configure as follows. At two ends of the circumferential direction groove formed on an outer circumferential surface of the tubular member, a first depression is formed from one end joining the inlet groove in an axial direction and a second depression is formed from the other end in the axial direction. When the connector and the counterpart connector are in a connected state, the locking pin becomes engaged with the first depression. When the outer sleeve is rotated with respect to the tubular member, the locking pin passes along the circumferential direction groove from the first depression to be engaged with the second depression.

Further, in one of the preferred embodiments according to the present invention, it is preferable to configure as follows. That is, the inner sleeve of the connector includes a front-end side taper part, a middle taper part, and a rear-end face receiving pressure from a compression spring provided outside the connector main body. When the connector is attached to the counterpart connector, the front-end side taper part comes in contact with the engaging ball. When the connector is connected with the counterpart connector, the middle taper part comes in contact with the engaging ball, conveys the pressure to the engaging ball, and presses the engaging ball engaged with the annular groove toward an inner side in a diameter direction.

Still further, in one of the preferred embodiments according to the present invention, it is preferable to configure as follows. The tubular member of the counterpart connector includes a front-end side taper part and the connector main body of the connector includes an O-ring. When the connector is connected with the counterpart connector, the front-end side taper part of the counterpart connector comes in contact with the O-ring.

Advantageous Effects of Invention

In the connector according to the present invention, when the connector main body of the connector is inserted into the tubular member of the counterpart connector, the engaging ball moves in the diameter direction to be engaged with the annular groove. Also, when the locking pin becomes engaged with the inlet groove, the connector and the counterpart connector are connected. Further, when the outer sleeve of the connector connected with the counterpart connector is rotated in the circumferential direction of the tubular member, the locking pin becomes engaged with the circumferential direction groove. As a result, the movement of the connector main body in the axial direction is restricted, and an effect of the connector not being removed from the counterpart connector even if the connector main body is pulled strongly in a removal direction is obtained.

In the preferred embodiment according to the present invention, if configured that the locking pin becomes engaged with the first depression when the connector and the counterpart connector are in a connected state and, when the outer sleeve is rotated with respect to the tubular member, the locking pin passes along the circumferential direction groove from the first depression to be engaged with the second depression, the rotation of the outer sleeve is restricted. As a result, an effect of the connector not being removed from the counterpart connector even if the connector main body is rotated is obtained.

Further, in one of the preferred embodiments according to the present invention, if configured that when the connector and the counterpart connector are in the connected state, the middle taper part comes in contact with the engaging ball, conveys pressure to the engaging ball, and presses the engaging ball being engaged with the annular groove toward the inner side in the diameter direction, an effect of greatly reducing backlash between the connectors can be obtained.

Still further, in one of the preferred embodiments according to the present invention, if configured that the front-end side taper part of the counterpart connector is in contact with the O-ring when the connector and the counterpart connector are in the connected state, an effect of further reducing backlash between the connecters to substantially zero can be obtained.

These and other objects and advantages of the present invention described above will become more apparent from the following description. The embodiments to be described below, however, are exemplary only and the present invention is not limited thereto.

BRIEF DESCRIPTION OF DRAWINGS

FIG. 1 shows plan views of connectors according to one embodiment of the present invention in which FIG. 1(A) shows a connector (plug) and a counterpart connector (receptacle) before being connected, FIG. 1(B) shows a state after they are connected, and FIG. 1(C) shows a state after a lock operation, respectively;

DESCRIPTION OF EMBODIMENTS

With reference to the drawings, preferred embodiments of the connector according to the present invention will be explained in detail.

A connector according to one embodiment described below is an example where the present invention is applied to an optical connector including: an optical connector plug where a connector main body is combined with a ferrule for supporting an optical transmission member (for example, an optical fiber or other light guides); and a receptacle comprised of a cylindrical member having an inner circumferential surface to be fitted with the ferrule. This is one example, however, and the present invention is not limited thereto.

Figure 1:
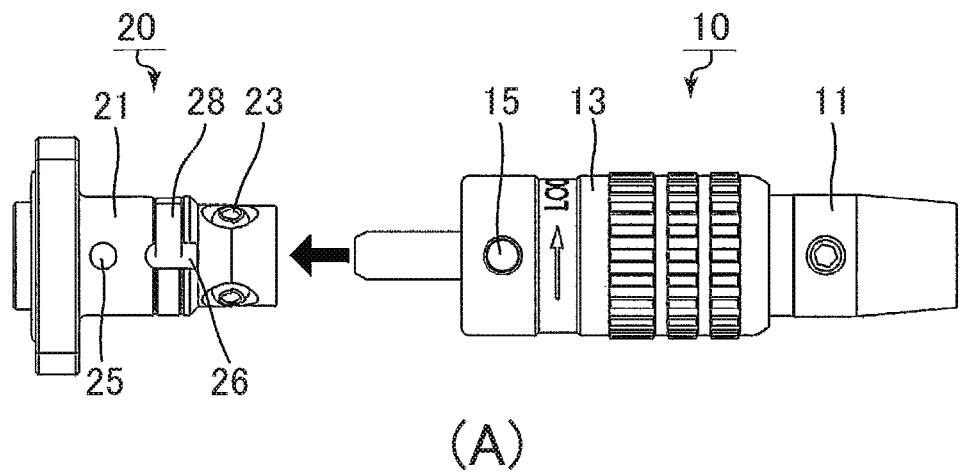
Figure 1:
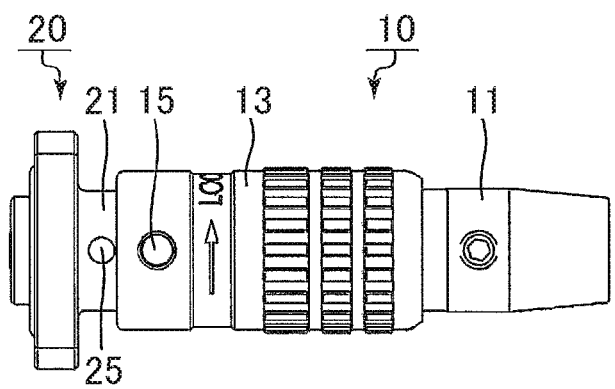
Figure 1:
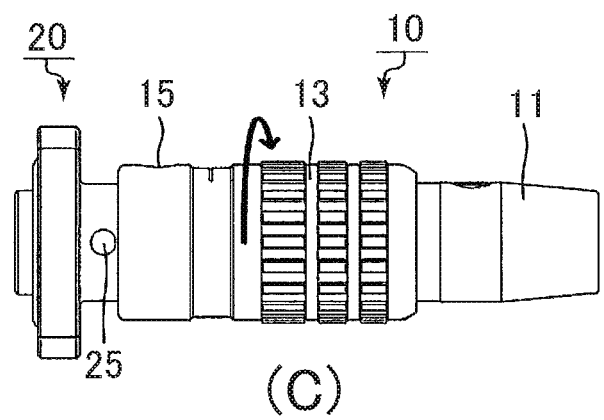

First, with reference to FIG. 1, processes of connection (ball lock) of the ball lock type connector capable of preventing unwanted removal and an operation of unwanted-removal prevention (rotary type lock) will be overviewed from a user's viewpoint. A connector according to one embodiment includes a connector 10 and a counterpart connector 20 which the connector 10 can be attached to or removed from. In an example shown in FIG. 1, the connector 10 is, for example, an optical connector plug and the counterpart connector 20 is, for example, a receptacle.

FIG. 1(A) shows an outward appearance of a connector before the connector 10 is connected to the counterpart connector 20. In the connector 10, reference numeral 11 denotes a connector main body, 13 denotes an outer sleeve movable in an axial direction, and 15 denotes a locking pin (part of it, a flat head, alone is shown). Also, in the counterpart connector 20, reference numeral 21 denotes a tubular member, 23 denotes, as described later, an engaging ball accommodated in a ball accommodation hole (in this example, three balls are arranged at intervals of 120°), 26 denotes an inlet groove, 28 denotes a circumferential direction groove, and 25 denotes a mark which shows a position of the inlet groove 26. A user conducts alignment of the connector 10 with respect to the counterpart connector 20 such that the locking pin 15 of the connector 10 and a mark of the counterpart connector 20 are located on an axial straight line and, subsequently, inserts the connector 10 into the counterpart connector 20.

FIG. 1(B) shows an outward appearance of the connectors in a connected state. At this time, the locking pin 15 of the connector 10 is engaged with the inlet groove 26 of the counterpart connector 20. As will be described, in this connection state, the engaging ball 23 of the tubular member 21 is in contact with an annular groove formed in the connector main body 11 and the connectors are in what is called a ball-locked state.

FIG. 1(C) shows an outward appearance of the connectors in an unwanted-removal prevention state. This shows the connectors in what is called a rotary-locked state where the outer sleeve 13 of the connector 10 in the connected state shown in FIG. 1(B) is rotated (by 90°, for example) in a circumferential direction. At this time, the locking pin 15 of the connector 10 is engaged with the circumferential direction groove 28 of the counterpart connector 20.

Next, with reference to FIGS. 1 to 12, configurations and operations of the connector will be explained in detail.

Figure 2:
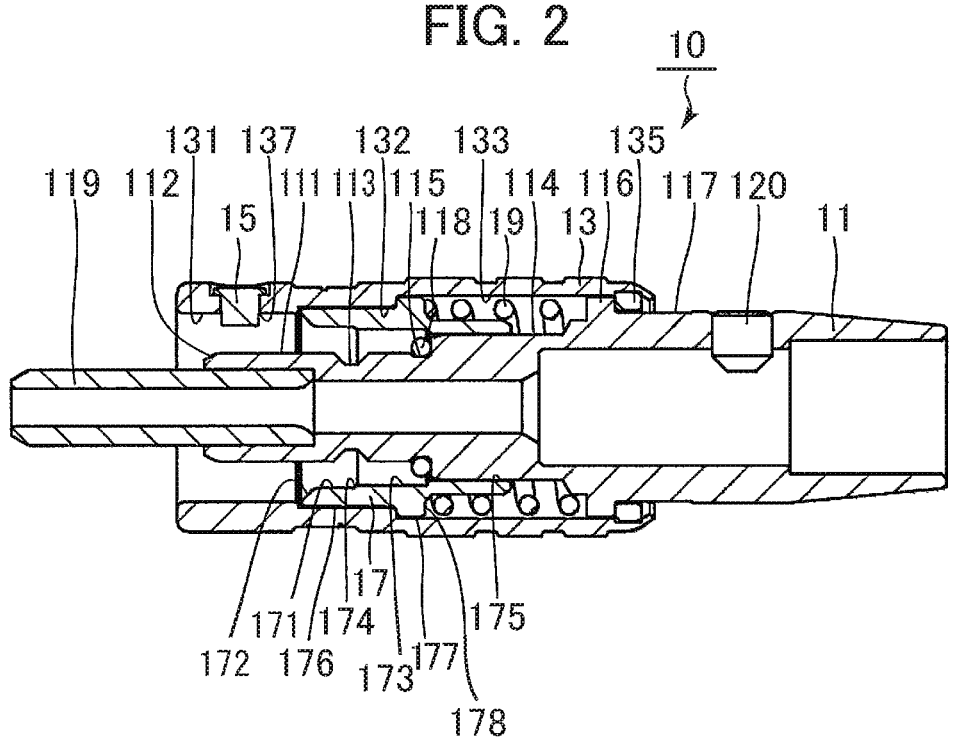
FIG. 2 is a sectional view of the connector (plug) in an axial direction according to one embodiment of the present invention.

FIG. 2 is a sectional view in an axial direction of the connector 10. The connector 10 includes: the connector main body 11; the outer sleeve 13; the locking pin 15; an inner sleeve 17; and a compression spring 19. On a front-end side of an outer circumferential surface 111 of the connector main body 11, a taper part 112 is formed. Further, an annular groove 113 is formed in a middle part and an O-ring groove 115 is formed on a rear-end side. In the O-ring groove 115, an O-ring 118 is placed. On a front-end side of the connector main body 11, for example, a ferrule 119 which supports an optical fiber core (not shown) can be provided. However, use of the ferrule is not compulsory. On a rear-end side of the connector main body 11, for example, an aperture into which an end portion of a cable (not shown), such as an optical fiber cable, is inserted is provided and, further, a screw 120 for fixing the cable to be inserted to the connector main body 11 is provided. A contour of the inner circumferential surface of the connector main body 11 can be designed freely according to a configuration of the cable inserted there.

The inner sleeve 17 is arranged movably in an axial direction on an outer circumferential surface 114 of the connector main body 11. A front-end side taper part 172 is formed on the front-end side of an inner circumferential surface 171 of the inner sleeve 17, and a middle taper part 174 is formed in a boundary between the inner circumferential surface 171 and an inner circumferential surface 173. Also, an inner circumferential surface 175 is opposed to the outer circumferential surface 114 of the connector main body 11, and a diameter of the inner circumferential surface 175 is slightly larger than or substantially equal to a diameter of the outer circumferential surface 114.

Outside the inner sleeve 17, the outer sleeve 13 is arranged movably in an axial direction. In a middle portion of an inner circumferential surface 131 of the outer sleeve 13, a locking-pin fixing hole 137 penetrating from the outer circumferential surface to the inner circumferential surface is formed. The locking pin 15 is fixed inside the locking-pin fixing hole 137 so that its front-end portion may project from the inner circumferential surface 131. Further, an inner circumferential surface 132 is opposed to an outer circumferential surface 176 of the inner sleeve 17, and a diameter of the inner circumferential surface 132 is slightly larger than or substantially equal to a diameter of the outer circumferential surface 176. Also, an inner circumferential surface 133 is opposed to an outer circumferential surface 177 of the inner sleeve 17. Furthermore, a diameter of the inner circumferential surface 133 is slightly larger than or substantially equal to a diameter of the outer circumferential surface 177.

The compression spring 19 is accommodated in a space enclosed by a rear-end face 178 of the inner sleeve 17, the outer circumferential surface 114 of the connector main body 11, a flange part 116, and the inner circumferential surface 133 of the outer sleeve 13. One end of the compression spring 19 is in contact with the flange part 116 and the other end is in contact with the rear-end face 178, and the pressure of the compressed spring is conveyed to the rear-end face 178. A rear-end side of the outer sleeve 13 is so caulked as to enclose a washer 135 therein. An inner diameter of the washer 135 is slightly larger than or substantially equal to a diameter of the outer circumferential surface 117 of the connector main body 11. The movement of the outer sleeve 13 in an axial direction and its removal from the connector main body 11 are restricted by a caulking mechanism using the washer 135 and the flange part 116.

Figure 3:
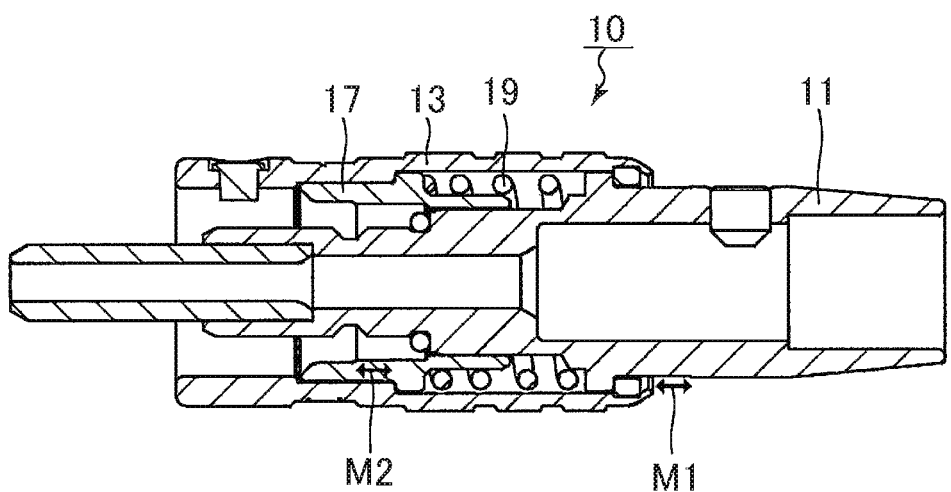
FIG. 3 is an explanatory diagram showing a portion of the connector (plug) movable in an axial direction according to one embodiment of the present invention.

In the connector 10 configured as above, with respect to the connector main body 11, the outer sleeve 13 can be moved in the axial direction against pressure of the compression spring 19 (the direction of an arrow of M1 shown in FIG. 3). Also, with respect to the connector main body 11, the inner sleeve 17 can be moved in the axial direction against the pressure of the compression spring 19 (the direction of an arrow of M2 shown in FIG. 3). Further, the outer sleeve 13 and the inner sleeve 17 can be moved independently. However, the above independent movement is limitative in that a step difference between the inner circumferential surface 132 and the inner circumferential surface 133 of the outer sleeve 13 does not get over a step difference between the outer circumferential surface 176 and the outer circumferential surface 177 of the inner sleeve 13, and vice versa.

Figure 4:
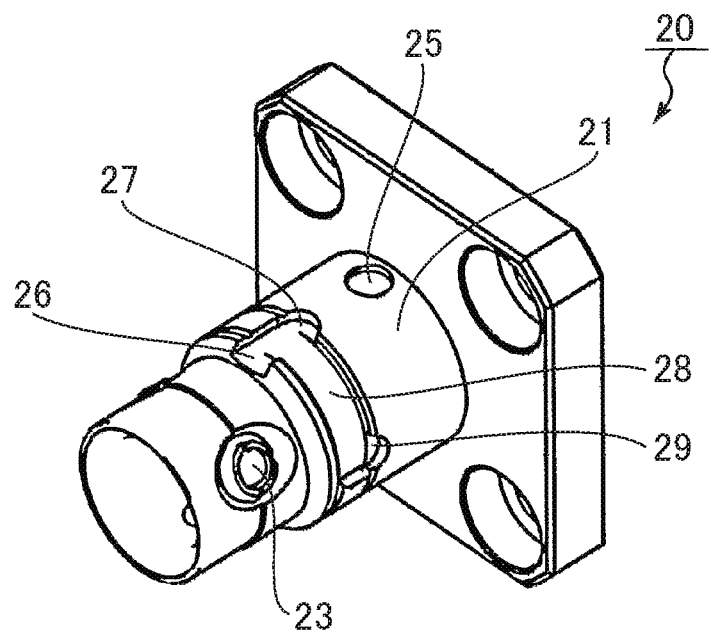
FIG. 4 is a perspective view showing a counterpart connector (receptacle) according to one embodiment of the present invention.
Figure 5:
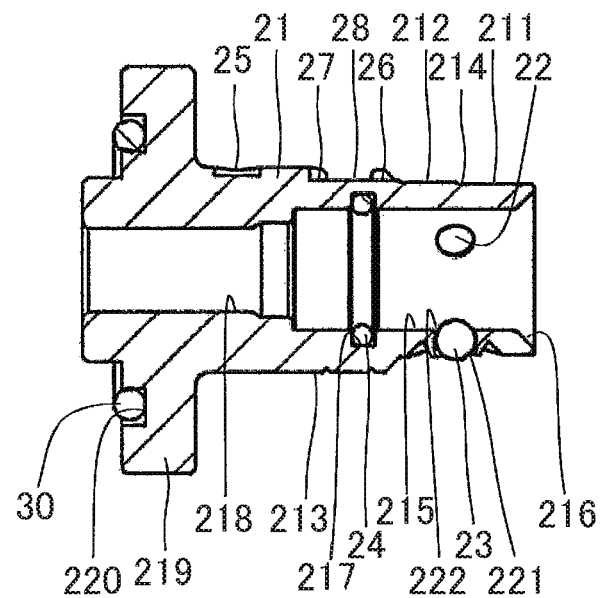
FIG. 5 is a sectional view in an axial direction showing the counterpart connector (receptacle) according to one embodiment of the present invention.

FIG. 4 is a perspective view of the counterpart connector 20 and FIG. 5 is a sectional view in an axial direction thereof. The counterpart connector 20 includes the tubular member 21 and the engaging ball 23. In the tubular member 21, three ball accommodation holes 22 penetrating a inner circumferential surface 215 from outer circumferential surfaces 211 and 212 thereof are formed at intervals of 120°. A diameter of an outer circumferential surface opening 221 and a diameter of an inner circumferential surface opening 222 of the ball accommodation hole 22 are slightly smaller than a diameter of the engaging ball. The engaging ball 23 can move in a direction of the diameter inside the ball accommodation hole 22. It is preferable that the diameter of the engaging ball 23 is larger than one half of a value obtained by subtracting a diameter of the inner circumferential surface 215 from a diameter of the outer circumferential surface 211 and larger than one half of a value obtained by subtracting the diameter of the inner circumferential surface 215 from a diameter of the outer circumferential surface 212. In other words, the diameters of the outer circumferential surfaces 211 and 212, the diameter of the inner circumferential surface 215, and the diameter of the engaging ball 23 may be chosen such that part of the engaging ball 23 whose diameter is larger than a thickness in a diameter direction of the tubular member 21 may come out on the outside of the outer circumferential surface opening 221 or it may come out on the inner side of the inner circumferential surface opening 222. Also, it is preferable that a step 214 is formed at a position opposite to the middle taper part 174 of the inner sleeve 17.

A front-end side taper part 216 is formed on the front-end side of the inner circumferential surface 215. Also, in a middle portion of the inner circumferential surface 215, an O-ring groove 217 is formed, and an O-ring 24 is placed inside the groove. The diameter of the inner circumferential surface 215 is slightly larger than or substantially equal to the outer circumferential surface 111 of the connector main body 11. Further, a diameter of an inner circumferential surface 218 is slightly larger or substantially equal to an outer diameter of the ferrule 119. A flange part 219 is provided on a rear end side of the tubular member 21. An O-ring groove 220 is formed in a back surface of the flange part 219, and an O-ring 30 is placed in the groove. The O-rings 24 and 30 are provided for achieving waterproof, which is not compulsory and may be omitted.

Also, on an outer circumferential surface 213 of the tubular member 21, the inlet groove 26 extending in an axial direction and the circumferential direction groove 28 extending in a circumferential direction over the outer circumferential surface 213 and joining the inlet groove 26 are formed. Furthermore, at two ends of the circumferential direction groove 28, a first depression 27 is formed from one end joining the inlet groove 26 in the axial direction and a second depression 29 is formed from the other end in the axial direction. Between the first depression and the second depression thus formed, there is a step difference in an axial direction of the circumferential direction groove 28. Widths of the inlet groove 26 and the circumferential direction groove 28 are slightly larger than or substantially equal to a diameter of the locking pin 15. Further, widths of the first depression 27 and the second depression 29 may be smaller than a radius of the locking pin 15. To be able to easily check a position of the inlet groove 26 visually, the mark 25 may be provided as required.

With reference to FIGS. 6 to 12, an operation of the ball lock when connecting the connector 10 configured as above and the counterpart connector 20 will be explained. For connecting the connectors with each other, it is preferable for a user to hold the outer sleeve 13 with fingers and insert the connector 10 into the counterpart connector 20 such that the outer circumferential surface 111 of the connector main body 11 is fitted onto the inner circumferential surface 215 of the tubular member 21.

Figure 6:
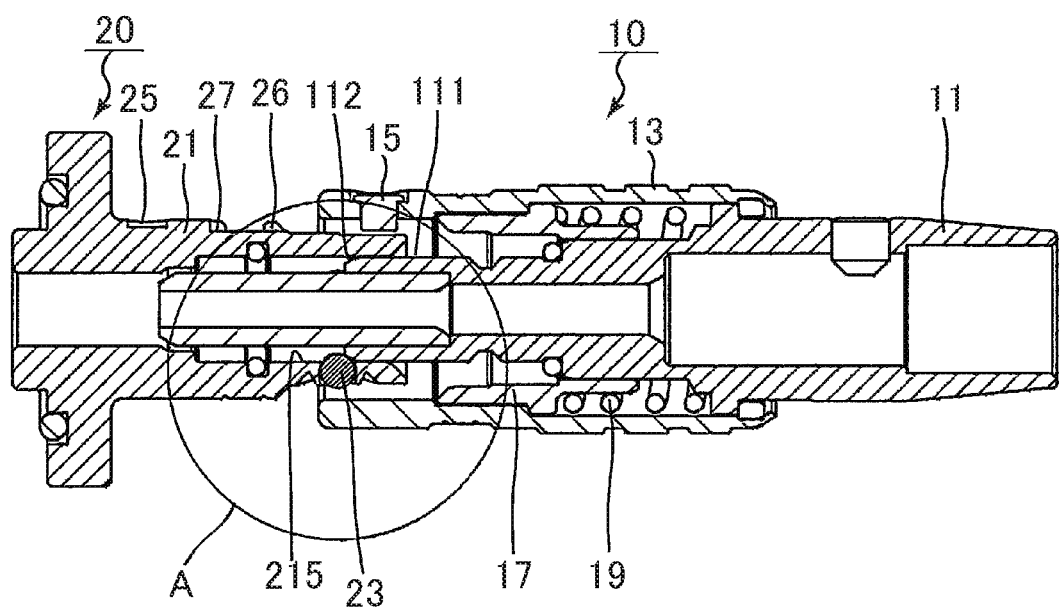
FIG. 6 is a sectional view in an axial direction showing a connection process of the connector (plug) and the counterpart connector (receptacle) according to one embodiment of the present invention.
Figure 7:
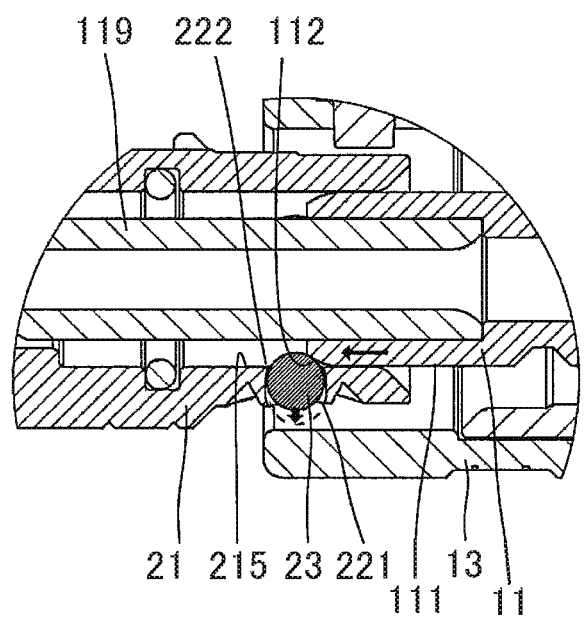
FIG. 7 is a partially enlarged sectional view of a circle A portion shown in FIG. 6.

FIG. 6 is a sectional view of the connector in an axial direction when inserting the connector 10 into the counterpart connector 20 until the taper part 112 of the connector main body 11 comes in contact with the engaging ball 23. FIG. 7 is a partially enlarged sectional view of a circle A portion shown in FIG. 6. From this state, when the connector 10 is further moved in an insertion direction, the engaging ball 23 inside the ball accommodation hole 22 formed in the tubular member 21 is pressed by the taper part 112 to move outside in a diameter direction. When the connector 10 is further moved, the outer circumferential surface 111 of the connector main body 11 covers the inner circumference surface opening 222.

Figure 8:
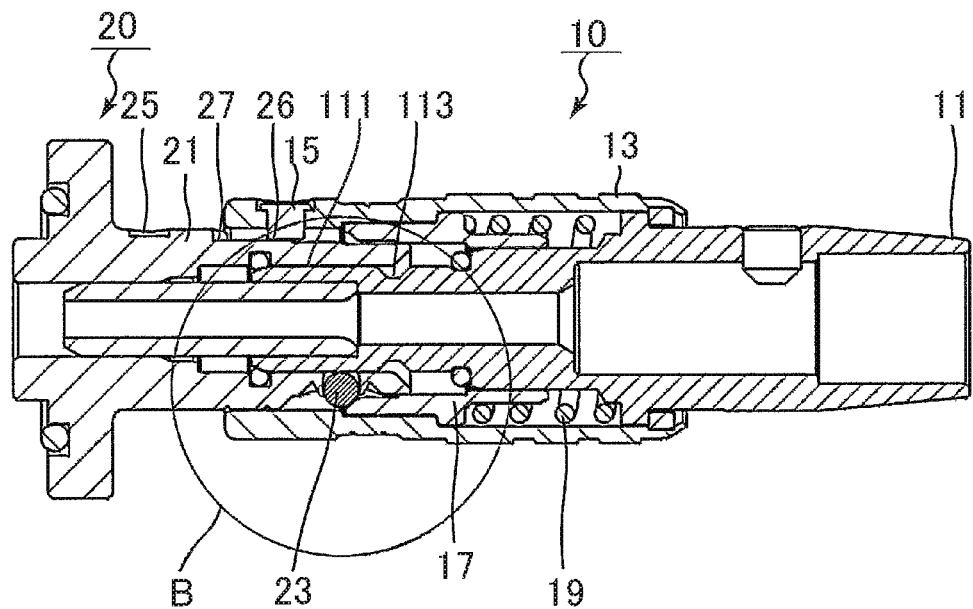
FIG. 8 is a sectional view in an axial direction showing a connection process of the connector (plug) and the counterpart connector (receptacle) according to one embodiment of the present invention.
Figure 9:
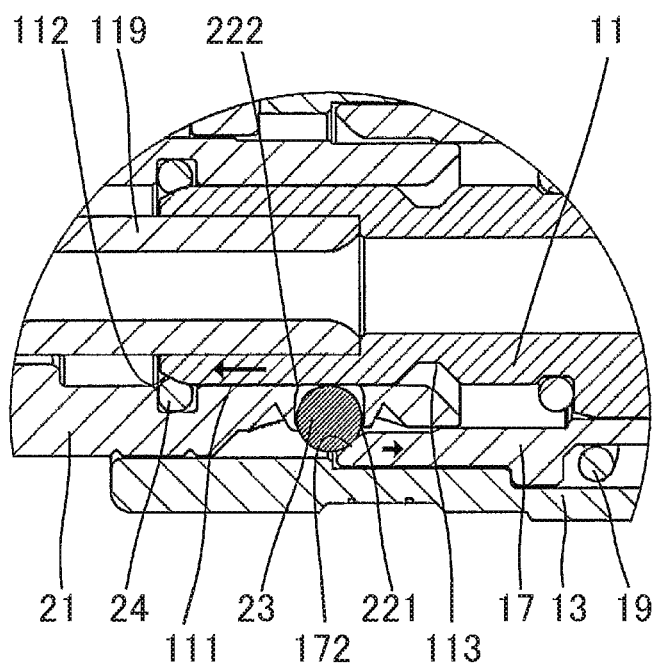
FIG. 9 is a partially enlarged sectional view of a circle B portion shown in FIG. 8.

FIG. 8 is a sectional view of the connector in an axial direction when the connector 10 is inserted into the counterpart connector 20 until a front-end side taper part 172 of the inner sleeve 17 of the connector main body 11 comes in contact with the engaging ball 23. FIG. 9 is a partially enlarged sectional view of a circle B portion shown in FIG. 8. Also, as shown in the drawing, in this state, the taper part 112 of the connector main body 11 may be in contact with the O-ring 24. However, such a configuration is not compulsory. From this state, when the connector 10 is further moved in the insertion direction, since the front-end side taper part 172 of the inner sleeve 17 remains in contact with the engaging ball 23, the movement of the inner sleeve 17 in the insertion direction is restricted by the engaging ball 23. As a result, against the pressure of the compression spring 19, the inner sleeve 17 moves in a direction opposite to a direction in which the connector main body 11 and the outer sleeve 13 move. When the connector 10 is further moved, an opening of the annular groove 113 formed in the outer circumferential surface 111 of the connector main body 11 begins to overlap with the inner circumferential opening 222. At this time, the front-end side taper part 172 of the inner sleeve 17 conveys the pressure of the compression spring 19 to the engaging ball 23, and urges the engaging ball 23 to move toward an inner side in a diameter direction.

Figure 10:
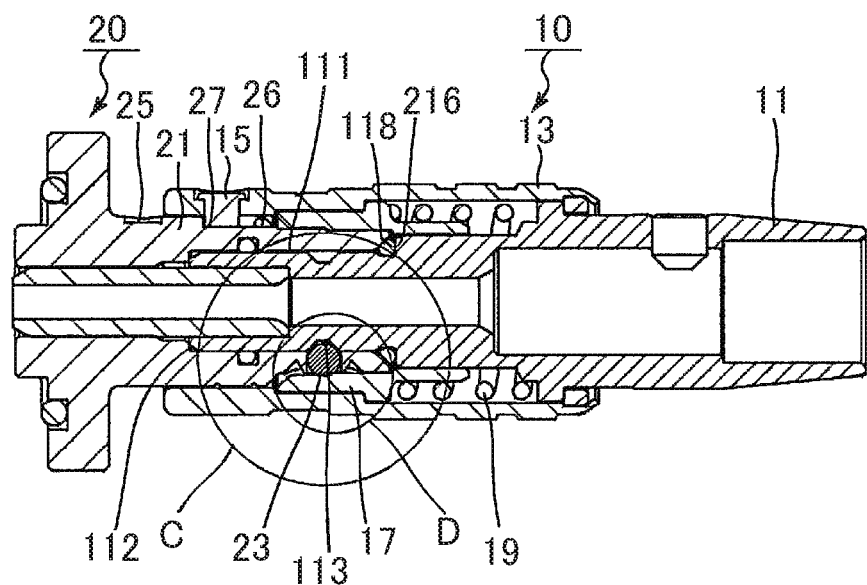
FIG. 10 is a sectional view in an axial direction showing a connection process of the connector (plug) and the counterpart connector (receptacle) according to one embodiment of the present invention.
Figure 11:
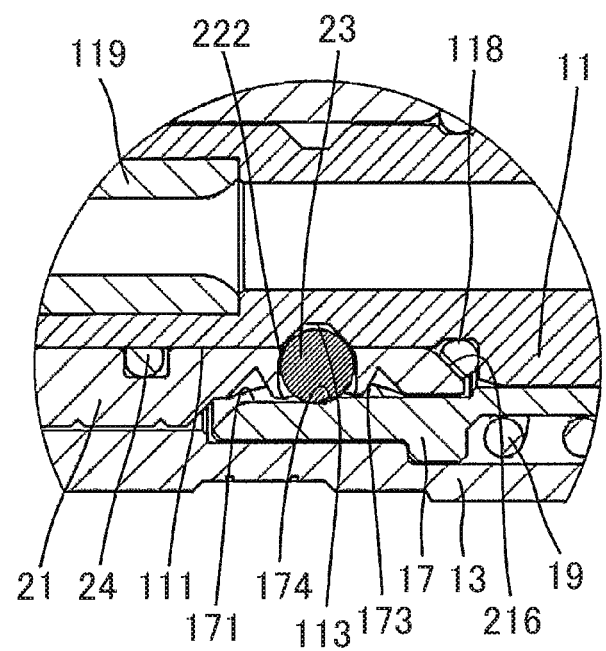
FIG. 11 is a partially enlarged sectional view of a circle C portion shown in FIG. 10.
Figure 12:
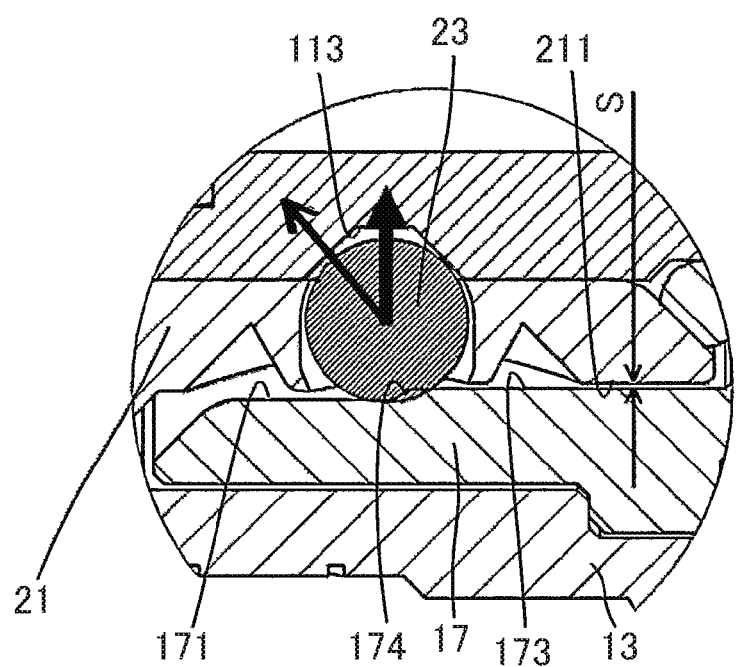
FIG. 12 is a partially enlarged sectional view of a circle D portion shown in FIG. 10.

FIG. 10 is a sectional view of the connector in an axial direction when the connector 10 is inserted into the counterpart connector 20 until the taper part 112 of the connector main body 11 comes in contact with a rear end of the inner circumferential surface 215 of the tubular member 21. FIG. 11 is a partially enlarged sectional view of a circle C portion shown in FIG. 10 and FIG. 12 is a partially enlarged sectional view of a circle D portion shown in FIG. 10. When the opening of the annular groove 113 overlaps with the inner circumferential surface opening 222, the engaging ball 23 moves to the inner side in the diameter direction so that it may be engaged with the annular groove 113. At this time, the engaging ball 23 having been in contact with the front-end side taper part 172 of the inner sleeve 17 changes, via a state of being in contact with the inner circumferential surface 171, into a state of being in contact with the middle taper part 174. To put it differently, over the inner circumferential surface of the inner sleeve 17, through the inner circumferential surface 171, the engaging ball 23 moves from the front-end side taper part 172 to the middle taper part 174. In this state, the middle taper part 174 conveys the pressure of the compression spring 19 to the engaging ball 23 and presses the engaging ball 23 engaged with the annular groove 113 toward an inner side in a diameter direction. As a result, backlash between the connectors can be reduced greatly. Also, by properly choosing a height S (equivalent to a difference between the outer circumferential surface 211 and the outer circumferential surface 212; see FIG. 12) of the step 214, an angle of inclination and a length of inclination of the middle taper part may be adjusted.

Moreover, in a state shown in FIG. 10, the front-end side taper part 216 of the counterpart connector 20 comes in contact with the O-ring 118 (see FIG. 11). As a result, it becomes possible to further reduce the backlash between the connectors to substantially zero.

Further, in a state shown in FIG. 10, the inner sleeve 17 conveys the pressure of the compression spring 19 in an axial direction to the outer sleeve 13. Therefore, the locking pin 15 of the outer sleeve 13 passes along the inlet groove 26 formed on the outer circumferential surface of the tubular member 21 to be engaged with the first depression 27. A process to rotate the outer sleeve 13 from this state with respect to the tubular member 21 to be in an unwanted-removal prevention state (rotary-type lock) will be explained below.

With reference to FIG. 1, for preventing unwanted removal of the connectors from each other, a user holds the outer sleeve 13 with fingers and rotates it through about 90° in a right-hand screw direction (see FIGS. 1b and 1c). At this time, the locking pin 15 of the outer sleeve 13 passes along the circumferential direction groove 28 from the first depression 27 to be engaged with the second depression 29 (see FIG. 4). As described above, the pressure in the axial direction is acting on the outer sleeve 13. Therefore, when rotating the outer sleeve 13, the user can feel that the locking pin 15 is being moved, against the pressure, from the first depression 27 to the second depression 29 getting over the step difference in a portion of the circumferential direction groove 28. Further, when the locking pin 15 becomes engaged with the second depression 29, the user can realize that the connectors are locked with each other by feeling their movement and hearing a "click." In this state, since the second depression 29 restricts the movement of the locking pin 15 in the circumferential direction, the outer sleeve 13 cannot be rotated easily. In other words, the outer sleeve 13 cannot be rotated unless the engagement of the locking pin 15 and the second depression 29 is released. In particular, when a depth of the second depression 29 in an axial direction is relatively deep, the outer sleeve 13 cannot be rotated unless the engagement of the locking pin 15 and the second depression 29 is released by pulling the outer sleeve 13, against the pressure, toward the rear-end side of the connector 10.

On the other hand, in this state, the connector 10 cannot be pulled out because the axial movement of the connector main body 11 is restricted by the lock of the engaging ball 23 engaged with the annular groove. However, the connector main body 11 can be rotated with respect to the tubular member 21 and, also, to the outer sleeve 13 and the inner sleeve 17. Moreover, even if the connector main body 11 is rotated, the connector 10 is not removed from the counterpart connector 20.

When removing the connector 10 from the counterpart connector 20, its operation is as follows. First, as described above, the outer sleeve 13 is changed into a state where the engagement of the locking pin 15 and the second depression 29 is released. Subsequently, the outer sleeve 13 is rotated through about 90° in a left-hand screw direction so as to allow the locking pin 15 to pass along the circumferential direction groove 29 and to return to an engagement position with the first depression 27. That is, from a state shown in FIG. 1(C), through the above operation, after returning to the state shown in FIG. 1(B) and FIG. 10, the connector 10 is drawn out from the counterpart connector 20. In addition, when the depth of the second concave 29 in the axial direction is relatively deep, in order to release the engagement of the locking pin 15 and the second concave 29, against the pressure, an additional operation to draw the outer sleeve 13 toward the rear-end side of the connector 10 may be required. This means that when the depth of the second depression 29 in the axial direction is relatively deep, as compared to a case where the depth is relatively shallow, the rotary-type lock is harder to be released, resulting in a more efficient unwanted-removal prevention effect.

The connector according to one embodiment described above can realize coupling (ball lock) of the connectors and the function of the removal prevention (rotary-type lock) simply by using one compression spring 19. Therefore, since the connector can be configured with use of small numbers of parts, there is an advantage of excelling in the productivity of the connectors.

In the description of the above embodiment, although the example in which the first depression 27 and the second depression 29 are formed at two ends of the circumferential direction groove 28 has been explained, these depressions may be omitted. Also, instead of omitting the depressions, the configuration may be such that a length of the circumferential direction groove 28 in the circumferential direction is made longer and the locking pin 15 does not return to the position of the inlet groove 26 with a little amount of rotation of the outer sleeve 13. As another example, the first depression 27 is omitted and the second depression 29 alone may be formed.

In the description of the above embodiment, the example has been given as to the case where the present invention is applied to the optical connector which includes: an optical connector plug where the connector body is combined with the ferrule for supporting the optical transmission member (for example, light guides such as an optical fiber etc.); and a receptacle. This is one example, however, and the present invention is not limited thereto. Needless to say, the present invention can be applied to electric connectors including a male contact and a female contact receiving the former; connectors of fluid application devices for liquid and gas and connectors used in daily necessities, such as connectors for air conditioning devices, connectors for water-pressure devices, etc.

INDUSTRIAL APPLICABILITY

The present invention can be widely applied to an electric connector for transmitting signals or electricity, an optical connector for transmitting optical signals or optical energy, connectors of fluid application devices for transporting fluid such as liquid and gas, connectors used in daily necessities, etc.

REFERENCE SIGNS LIST

10: Connector
11: Connector main body
111, 114, 117, 176, 177, 211, 212, 213: Outer circumferential surface
112: Taper part
113: Annular groove
115, 217, 220: O-ring groove
116, 219: Flange part
24, 30, 118: O-ring
119: Ferrule
120: Screw
13: Outer sleeve
131, 132, 133, 171, 173, 175, 215, 218: Inner circumferential surface
135: Washer
137: Locking-pin fixing hole
15: Locking pin
17: Inner sleeve
172, 216: Front-end side taper part
174: Middle taper part
178: Rear-end face
19: Compression spring
20: Counterpart connector
21: Tubular member
214: Step
22: Ball accommodation hole
221: Outer circumferential surface opening
222: Inner circumferential surface opening
23: Engaging ball
25: Mark
26: Inlet groove
27: First depression
28: Circumferential direction groove
29: Second depression

The invention claimed is:
1. A connector with a lock mechanism, comprising:
a connector; and a counterpart connector which the connector can be attached to or removed from, wherein the connector includes:

a connector main body having an annular groove formed in an outer circumferential surface thereof;

an inner sleeve arranged movably in an axial direction over the outer circumferential surface of the connector main body; and an outer sleeve arranged movably in an axial direction outside the inner sleeve and having a locking pin projecting from an inner circumferential surface close to a front end of the outer sleeve, wherein the counterpart connector includes:

a tubular member in which at least one ball accommodation hole penetrating an inner circumferential surface from an outer circumferential surface thereof, an inlet groove extending over the outer circumferential surface in an axial direction, and a circumferential direction groove extending over the outer circumferential surface in a circumferential direction and joining the inlet groove are formed; and an engaging ball accommodated in the ball accommodation hole, wherein, when the connector main body of the connector is inserted into the tubular member of the counterpart connector, the engaging ball moves in a diameter direction to be engaged with the annular groove and the locking pin becomes engaged with the inlet groove, and wherein, when the outer sleeve of the connector connected with the counterpart connector is rotated with respect to the tubular member, the locking pin becomes engaged with the circumferential direction groove.

2. The connector according to claim 1, wherein, at two ends of the circumferential direction groove formed on an outer circumferential surface of the tubular member, a first depression is formed from one end joining the inlet groove in an axial direction and a second depression is formed from the other end in the axial direction, and wherein the locking pin becomes engaged with the first depression when the connector and the counterpart connector are in a connected state and, when the outer sleeve is rotated with respect to the tubular member, the locking pin passes along the circumferential direction groove from the first depression to be engaged with the second depression.

3. The connector according to claim 1, wherein the inner sleeve of the connector includes a front-end side taper part, a middle taper part, and a rear-end face receiving pressure from a compression spring provided outside the connector main body, wherein the front-end side taper part comes in contact with the engaging ball when the connector is attached to the counterpart connector, and wherein, when the connector is connected with the counterpart connector, the middle taper part comes in contact with the engaging ball, conveys the pressure to the engaging ball, and presses the engaging ball engaged with the annular groove toward an inner side in a diameter direction.

4. The connector according to claim 3, wherein the tubular member of the counterpart connector includes a front-end side taper part, wherein the connector main body of the connector includes an O-ring, and wherein the front-end side taper part of the counterpart connector comes in contact with the O-ring when the connector is connected with the counterpart connector.

5. The connector according to claim 1, wherein, of the two ends of the circumferential direction groove formed on the outer circumferential surface of the tubular member, a depression is formed from one end not joining the inlet groove in an axial direction, and wherein the locking pin passes along the circumferential direction groove to be engaged with the depression when the outer sleeve of the connector connected with the counterpart connector is rotated with respect to the tubular member.

* * * * *